Patented Dec. 17, 1940

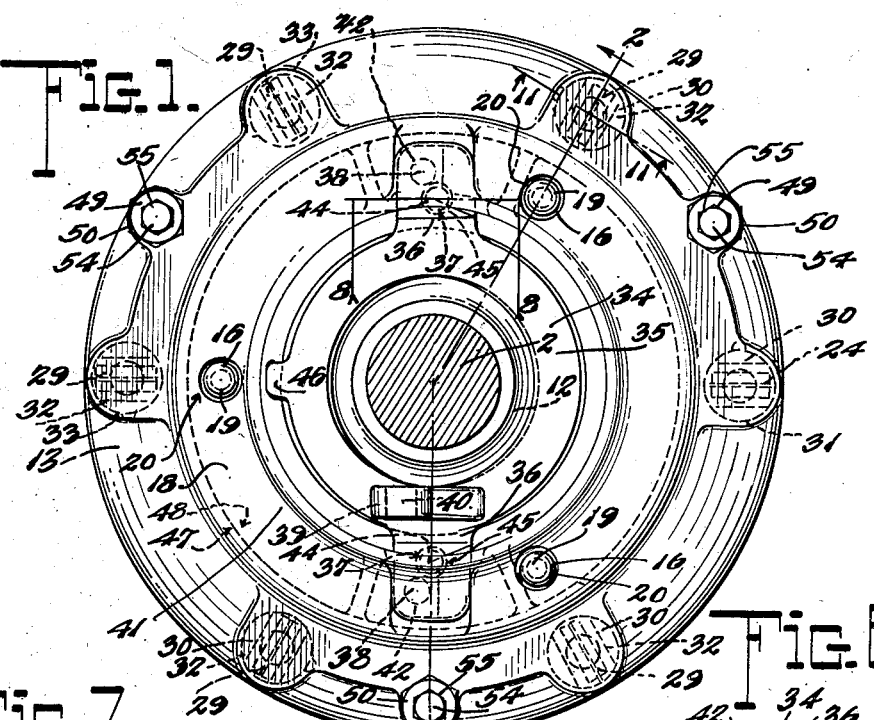
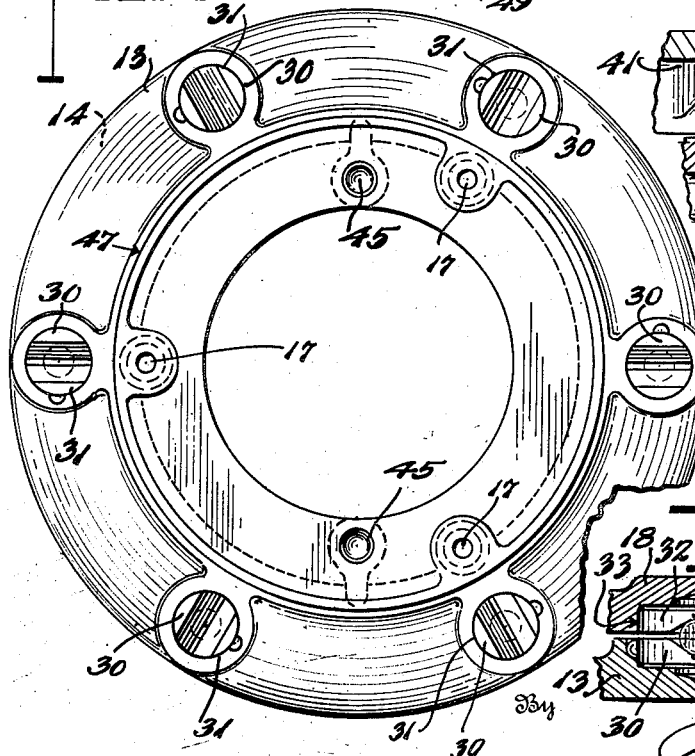
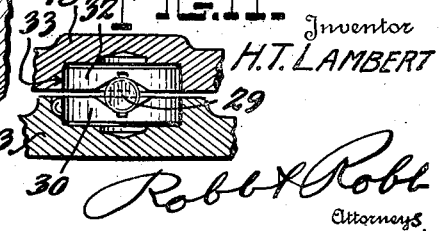

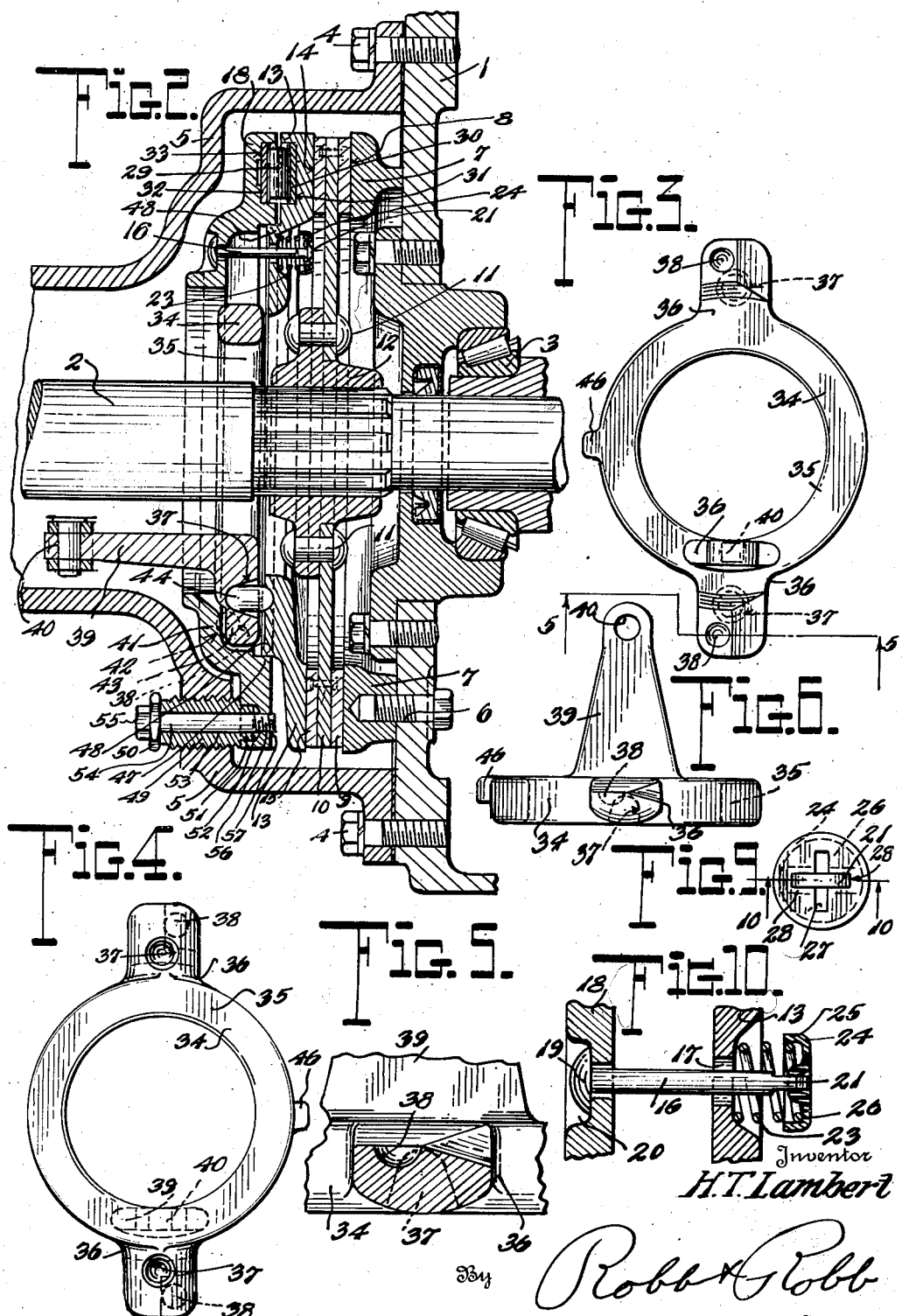

2,225,562

UNITED STATES PATENT OFFICE 2,225,562

BRAKE MECHANISM

Homer T. Lambert, St. Joseph, Mich.

Application June 14, 1939, Serial No. 279,186

17 Claims. (Cl. 188—72)

This invention relates to power transmission, and more particularly, to brake mechanism as one type of power transmission where the power is absorbed or dissipated to retard or interrupt motion of a moving part. Particularizing still further, the invention primarily has to do with an improved brake assembly of the self-energizing or servo type, and to a novel prime actuator therefor by which the self-energization or servo action is initiated.

One of the principal objects of the invention is to provide a brake mechanism of the type above referred to, which is especially applicable to tractors and other vehicles where relatively heavy duty is involved, although not limited to this class, the parts of the mechanism being so constructed and arranged as to be especially rugged and sturdy to better withstand the stresses and strains of normal and even somewhat abnormal service.

A further object of the invention is to provide an improved brake assembly of the so-called disc type, wherein the parts may be largely preassembled in a more or less unitary assembly for convenient installation, while at the same time permitting ready removal or disassembly for purposes of replacement or repair.

Still another object of the invention is to provide a brake mechanism which includes a novel and improved prime actuator which is operable by a minimum application of force, and which, in the case of a self-energizing or servo brake, is adapted to impart a lateral thrust to the brake actuating part, while at the same time stressing said part in a direction normally aiding or initiating the servo action.

A still further object of the invention is to provide an improved brake mechanism which is of relatively simple and inexpensive construction, and in which provision is made for easily adjusting the same and for maintaining the proper adjustment and alignment of the parts relative to each other and to the central axis of the braking elements or the part to be braked.

Other and further objects and advantages of the invention will be hereinafter described, and the novel features thereof defined in the appended claims.

In the drawings:

Figure 1 is a side elevation of a brake assembly constructed in accordance with the invention;

Figure 2 is a sectional view, taken approximately on the plane of the line 2—2 of Figure 1;

Figure 3 is a view in elevation of the prime actuator as seen from the lever side;

Figure 4 is an elevation of the prime actuator shown in Figure 3, but as viewed from the opposite side;

Figure 5 is a sectional view through the ball fulcrum recesses in the prime actuator, taken about on the plane of the line 5—5 of Figure 3;

Figure 6 is an end elevation of the prime actuator as viewed from the bottom of Figure 3;

Figure 7 is a detail plan view of the actuator or power disc which forms one element of the brake assembly;

Figure 8 is a sectional view, taken about on the plane of the line 8—8 of Figure 1, and illustrating the action of the thrust pins to produce an angular or rotative force component on the actuator or power disc incident to operation of the prime actuator to its brake applying position shown in dotted lines, the full lines showing the brake released position of the parts;

Figure 9 is a detail plan view of one of the spring retainer plates or seats, and illustrating its cooperation with the tie-bolt or pin which is normally associated therewith;

Figure 10 is an enlarged sectional view, taken about on the plane of the line 10—10 of Figure 9; and Figure 11 is a sectional view, taken about on the plane of the line 11—11 of Figure 1, showing more clearly the details of one pair of opposed inserts and intermediate roller means which produce the servo action responsive to relative angular movement of the actuator or power disc and energizer plate.

Like reference characters designate corresponding parts in the several figures of the drawings, wherein 1 generally denotes the frame or transmission case of a tractor or an equivalent vehicle to which the brake mechanism is adapted to be applied, the frame having a wheel shaft or axle 2 journaled therein for rotation in the customary manner. 3 generally designates the usual anti-friction bearing for the shaft or axle 2. Removably attached to the frame 1 by means of a plurality of bolts 4 is a brake housing 5, which is adapted to substantially enclose and support the brake assembly in a manner which will be hereinafter more fully described.

Also removably secured to the frame 1 by means of a plurality of bolts 6 (preferably 4 in number) is a stationary brake ring 7, having a flat annular friction face 8 disposed for contact with the friction lining 9 carried by a brake disc or ring 10, as clearly shown in Figure 2. The brake ring or disc 10 is fixed by rivets 11 or in any other suitable manner to a hub 12 which is splined to the wheel shaft or axle 2 so as to be positively rotated therewith, while permitting axial movement of the disc 10 on the shaft 2. In other words, the hub 12 is slidable on the shaft 2 so as to cause the brake disc or ring 10 to float between the stationary ring 7 and a second power or actuator brake disc 13. The disc 13 is similarly provided with a flat friction face 14 which is adapted to coact with the friction lining 15 carried by the floating disc or ring 10 opposite to the friction lining 9. The power or actuator disc 13 is held in place by a series of tie-bolts or pins 16 (preferably three in number), which extend loosely through apertures 17 in the disc 13 and which are carried by a fixed energizer plate 18. The tie-bolts or pins are provided at one end with enlarged heads 19 seating in recesses 20 in the energizer plate 18, while the opposite ends of the tie-bolts or pins are preferably T-shaped, as at 21, as will be best understood from reference to Figures 2 and 9. A spring 23 is interposed between the actuator or power disc 13 and the T-shaped heads 21 of the respective tie-bolts or pins 16, one end of each spring bearing upon the actuator or power disc 13, and the opposite end seating in a retainer or spring seat 24. The construction of the retainer or spring seat 24 is best shown in Figures 9 and 10, from which it will be observed that the retainer is provided with an annular flange or skirt 25 forming a cup 26 for receiving the end of the spring 23 when disposed about the tie-bolt or pin 16 intermediate the disc 13 and the retainer 24. The retainer 24 is provided with an elongated relatively narrow slot 27 which is of sufficient size to permit the T-shaped head 21 of the tie-bolt or pin 16 to pass therethrough, when aligned therewith, and at opposite sides of the slot 27, the retainer is recessed as by forming depressions 28 therein. By forcing the retainer over the T-shaped head 21 of the tie-bolt or pin 16 against the pressure of the coil spring 23, and then turning the retainer one-quarter of a turn relative to the tie-bolt or pin 16, the T-shaped head 21 is caused to seat in the recesses 28, 28, thereby locking the parts in their assembled condition, as shown in Figure 2, wherein the springs 23 act to normally yieldably hold the actuator or power disc 13 away from the brake disc or ring 10. Obviously, the actuator or power disc 13 may be disconnected from the energizer plate 18 and tie-bolts or pins 16 by depressing the spring retainers 24 on the tie-bolts or pins, against the force of the springs 23, and then rotating the retainers one-quarter turn, while so depressed, to bring the slots 27 into register with the T-shaped heads 21, whereupon the retainers may be removed from the tie-bolts or pins.

Between the actuator or power disc 13 and the energizer plate 18 is arranged a series of hardened inserts, each having inclined converging cam faces providing seats for the interposed rollers 29. The inserts in the actuator or power disc 13 are designated 30, and are preferably fixed against angular movement in their recesses 31 in any suitable manner. The inserts, generally designated 32 in the energizer plate 18, are preferably free to permit angular movement in their recesses 33. In mounting the rollers 29 between the actuator or power disc 13 and the energizer plate 18, the grooves formed by the oppositely inclined surfaces provided in each of the respective opposed inserts are aligned so that the rollers will be normally disposed at the base of their respective grooves or seats. The rollers are free and unattached, so that when relative angular movement occurs between the actuator or power disc 13 and the energizer plate 18, the rollers 29 tend to climb the inclined surfaces of their respective grooves, thereby imparting a lateral or axial thrust to the actuator or power disc 13, and the actuator or power disc 13 moves towards the brake disc or ring 10, against the pressure of the springs 23. The construction and assembly of the inserts and rollers as described above generally corresponds to that disclosed in my prior Patent No. 2,063,445, granted December 8, 1936, and reference may be had to this patent for a more detailed explanation of the construction and operation.

The braking operation of the mechanism hereinbefore described is initiated through a prime actuator which is an improved and novel construction, said prime actuator generally being designated 34, and having the form of a collar or ring 35 adapted to straddle or encircle the wheel shaft or axle 2, and being provided with diametrically opposed radially projecting arms 36, 36, each formed with a recess 37 in one side thereof lying on the diameter of the ring 35. Each of the arms or bosses 36 is also provided with a recess 38 in its side opposite to the recess 37, the recesses 38, 38 being transversely offset respecting the recesses 37, 37. Extending laterally from the ring 35 at the same side as the recesses 38, 38 is a lever 39 which is preferably integrally formed with the ring and provided with an aperture 40 which serves to connect the lever 39 with a brake rod or other instrumentalities (not shown) through which the braking action may be controlled by the operator of the vehicle in the usual manner. The arms 36, 36 of the prime actuator 34 are disposed within an overhanging bell or flange 41 formed as a part of the energizer plate 18, said bell or flange being provided with diametrically opposed recesses 42, 42 and respectively arranged in opposed relation to the recesses 38, 38 in the prime actuator. Balls 43 are interposed between the respective pairs of opposing recesses 38, 42 and constitute fulcrums about which the prime actuator 34 rocks when force is applied to the lever 39 in an obvious manner. In the normal position of the prime actuator 34, the ring 35 is substantially concentric with the central axis of the brake discs hereinbefore described and the axis of the wheel shaft or axle 2, and the lever 39 is normally parallel to but displaced to one side of the central axis of these parts, as will be understood from reference to Figure 8. Elongated thrust pins 44 having their opposite extremities rounded or of partly spherical form are interposed between the prime actuator 34 and the actuator or power plate 13, the thrust pins being disposed at the side of the prime actuator opposite to the balls 43. As clearly shown in Figure 2, the thrust pin recesses 37, 37 flare outwardly from their bottoms so as to permit the thrust pins to be freely movable laterally when one end of each pin is seated in its corresponding recess 37. The opposite ends of the respective thrust pins 44 are seated in recesses 45 formed in the actuator or power disc 13. Due to the yielding action of the springs 23 which normally urge the actuator or power disc 13 towards the energizer plate 18, the thrust pins 44, prime actuator 34 and balls 43 are held in their cooperative, assembled relation, a shown in Figure 2. Since the thrust pin recesses 37 in the prime actuator 34 are transversely offset respecting the balls 43 and ball recesses

38, 42, an axial or lateral thrust will be imparted to the thrust pins 44 responsive to rocking movement of the prime actuator 34 in one direction on the balls 43 as a fulcrum. This lateral thrust is in turn imparted by the thrust pins 44 to the actuator or power disc 13 and serves to thrust the latter towards the floating disc or ring 10 which rotates with the wheel shaft or axle 2.

At the same time as the lateral thrust is produced by the prime actuator 34 on the thrust pins 44, as described above, the thrust pins 44 tend to stress the actuator or power disc 13 in an angular direction, it being understood that the actuator or power disc 13 is so mounted in relation to the energizer plate 18 as to have a limited angular or rotative movement relative thereto to permit the functioning of the rollers 29 to impart a lateral or braking thrust to the disc 13 as the rollers ride up the inclined surfaces of the grooves formed in the inserts 30, 32. The angular stress produced by the thrust pins 44 generally corresponds to that disclosed in my prior Patent No. 2,063,443, granted December 8, 1936, and also in my Patent No. 2,063,445 hereinbefore referred to, and for this reason, further explanation thereof is unnecessary herein.

As the actuator or power disc 13 comes into contact with the adjacent friction lining 15 on the floating rotary disc 10, pursuant to operation of the prime actuator 34 to apply the brake, the disc 13 takes up a rotary movement imparted to it by the ring or disc 10, thereby producing a limited angular rotation of the disc 13 and causing the rollers 29 to climb the inclined cam surfaces of the inserts 30, 32, which in turn produce a further axial or lateral movement of the disc 13 tending to compress the disc 10 between the same and the stationary ring 7. This camming action of the rollers is technically known as a servo action.

When the lever 39 of the prime actuator 34 is moved in the opposite direction to rock the prime actuator 34 to a position permitting release of the brake, the actuator or power disc 13 is laterally moved by the springs 23 away from the brake ring 10 to disengage the friction surfaces of the braking elements and condition the brake mechanism for a subsequent brake application. To limit the rocking movement of the prime actuator 34 in the brake releasing direction, the ring 35 is provided with a radially outwardly projecting lug or abutment 46 which serves as a stop by engaging the inner face of the bell 41 of the energizer plate 18 as the lever 39 assumes its proper alignment with regard to the center line of the brake assembly. The laterally extending arms 36 of the actuator 34 may be cut away or otherwise suitably bevelled or tapered as clearly shown in Figs. 3, 5, and 6, to allow the actuator to rock to its brake applying position without interference, as previously described.

In the limited angular or rotative movement of the actuator or power disc 13, relative to the energizer plate 18, the thrust pins 44 are free to assume any angular position, as generally illustrated in broken lines in Figure 8, such inclination of the thrust pins being permitted by the flaring form of the pin recesses 37 in the prime actuator 34. The degree of inclination of the thrust pins will, of course, depend upon the extent of angular or rotative displacement of the disc 13 during the servo action. Under all conditions, the thrust pins are capable of producing an axial thrust on the disc 13, as well as initially creating a force component acting to angularly stress the disc when the prime actuator 34 is rocked in a direction to apply the brake. Restoration of the disc 13 to its released position generally represented in Figure 2, with the thrust pins disposed substantially normal to the disc and parallel to the central axis thereof, is automatically effected by the springs 23 when the prime actuator 34 is rocked to the brake releasing position. Through the arrangement as hereinbefore described, the axial thrust is imparted to the disc 13 relatively close to its central axis, thereby minimizing distortion of the disc in the operation of the brake mechanism. It will also be observed that the disposition of the rollers 29 and the inserts 30, 32 is such that the axial thrust imparted to the disc 13 by the servo action is effected at a point relatively close to the friction surfaces of the braking elements, and preferably directly opposite to the points of contact of the friction surfaces, as will be clearly understood from reference to Figure 2, thus further minimizing undue distortion of the braking elements and causing the friction surfaces to engage with a substantially uniform contact throughout the friction area.

In the lateral or axial movement of the actuator or power disc 13 towards and away from the rotatable ring 10, it is guided and maintained in concentric relation to the energizer plate 18 through slidable engagement of an annular shoulder 47 formed on the disc 13, with the inner face of an annular flange 48, the engagement of these parts being sufficiently free to permit relative axial and rotative movement therebetween.

The energizer plate 18 is adjustably mounted within and fixed to the brake housing 5 in a manner now to be described. The housing 5 is provided with a plurality of threaded openings, preferably three in number, equally spaced apart, for receiving externally threaded studs 49, each having a hex nut 50 fixed to the outer end thereof or formed integrally therewith. The inner end of each stud 49 is reduced in size, as at 51, and projects into a recess 52 formed in the energizer plate 18. Each stud 49 is provided with an axial bore 53 extending centrally thereof from end to end, and a bolt 54 having a hex head 55 at one end and threaded at the opposite end at 56 extends through the bore 53 in each stud 49, with its threaded extremity 56 received in a threaded aperture 57 formed in the energizer plate 18 coaxial with each of the recesses 52. By this arrangement, the proper clearance between the braking elements of the assembly may be initially set when the brake mechanism is assembled, and convenient adjustment of the brake to take up wear is permitted.

When adjusting the brake, the studs 49 are first freed by backing out or loosening the bolts 54 a slight amount, and then the studs 49 are drawn up tight by the application of a wrench or other suitable instrumentality to the nuts 50, which are a part of the studs. When the studs 49 have been drawn up tight, they are then backed off slightly until the proper clearance between the brake discs 7 and 13 and the middle ring 10 is obtained. The bolts 54 are then drawn up tight, thereby locking the studs 49 in their adjusted positions.

It will be understood from the foregoing that the main elements of the brake mechanism constitute a unitary assemblage, excepting for the fixed ring 7 and the floating ring or disc 10. This is especially advantageous since it greatly facilitates installation of the brake mechanism and/or removal thereof for purposes of replacement or repair. To apply new friction linings 9 and 15 to the floating ring or disc 10, it is not necessary to disassemble the actuator or power disc respecting the energizer plate 18 and the prime actuator 34, as these parts may be removed as a unitary assemblage and reapplied simply by removing the bolts 4 which secure the brake housing 5 to the frame 1, and subsequently replacing the bolts, with or without removing the studs 49 and bolts 54. When installed, the brake mechanism lies around the axis of the wheel shaft or axle 2, and is maintained in accurate coaxial alignment therewith.

The brake housing 5 referred to generally above is preferably the inner or "bell" end of the rear axle housing and constitutes the brake enclosure, this housing being secured to the transmission or differential casing which is usually located on the longitudinal center of the vehicle.

This arrangement permits a dust-tight enclosure for the brake unit, preventing dust and foreign abrasive material from reaching the braking surfaces or operating parts. Also, if desirable, oil or other suitable liquid may be introduced in the casing to assist in dissipating the heat generated during the braking action.

By mounting the brake assemblies at the inner ends of the axle housings, adjacent the transmission or differential casing, especially in tractor vehicles or the like, the axle housing may be readily removed and longer or shorter one replaced for the purpose of changing the vehicle tread width as is customary in tractors, without disturbing the relation of the brake actuating parts.

The disposition of the thrust or toggle pins at equal points on opposite sides of the central axis, when the engagement of the relatively movable disk 13 with the brake disk 10 takes place, causes these pins to tilt in the direction of rotation of the disk and thus produce an additional thrust on the movable disk 13 in the direction of rotation, which assists in the servo action of the rollers as the braking surfaces come together.

It is to be noted that the construction herein shown has been put into extensive commercial use and has demonstrated beyond question its effectiveness as a brake construction especially adapted for tractor vehicles, but it is to be understood that the invention is not restricted to this type of vehicle or to the construction herein shown and described, as changes and alterations may be made therein without departing from the spirit of the invention and within the scope of the claims hereto appended.

Having thus described my invention, what I claim as new and desire to secure by Letters Patent is—

1. In apparatus of the class described, the combination with power transmission elements adapted by engagement to transmit power from one to the other, one of said elements being mounted to move bodily towards and away from the other, and means actuated by power transmitted between said elements for moving said movably mounted element in the direction of engagement, of an actuator rockably mounted at one side of said movably mounted transmission element with its rocking axis disposed normal to the direction of movement of the movable transmission element, and means operable responsive to the actuator for stressing the movable transmission element in a direction for effecting angular movement thereof.

2. In apparatus of the class described, the combination with a rotatable element to be braked, of a braking element bodily movable towards and away from the same and also having limited angular movement, a stationary member disposed at one side of the braking element, means interposed between the stationary member and the braking element aforesaid and operable responsive to relative angular movement between the braking element and stationary member for moving said braking element towards braking engagement with the rotatable element to be braked, actuator means for moving said braking element into engagement with the rotatable element to be braked, and means for normally yieldably urging said braking element away from the rotatable element to be braked, said last named means being so constructed and arranged as to secure the braking element, stationary member, and actuator means together as a unitary assemblage.

3. In apparatus of the class described, the combination with a rotatable element to be braked, of a braking element bodily movable towards and away from the same and also having limited angular movement, a stationary member disposed at one side of the braking element, means interposed between the stationary member and the braking element aforesaid and operable responsive to relative angular movement between the braking element and stationary member for moving said braking element towards braking engagement with the rotatable element to be braked, actuator means for moving said braking element into engagement with the rotatable element to be braked, and means for normally yieldably urging said braking element away from the rotatable element to be braked, said last named means comprising a plurality of tie-members extending through the braking element and stationary member, and spring means interposed between the ends of the tie-members and the braking element at the side of the latter opposite to the stationary member.

4. In apparatus of the class described, the combination with a rotatable element to be braked, of a braking element bodily movable towards and away from the same and also having limited angular movement, a stationary member disposed at one side of the braking element, means interposed between the stationary member and the braking element aforesaid and operable responsive to relative angular movement between the braking element and stationary member for moving said braking element towards braking engagement with the rotatable element to be braked, actuator means for moving said braking element into engagement with the rotatable element to be braked, and means for normally yieldably urging said braking element away from the rotatable element to be braked, said last named means comprising a plurality of tie-members extending through the braking element and stationary member, and spring means interposed between the ends of the tie-members and the braking element at the side of the latter opposite to the stationary member, and a retainer detachably mounted on each tie-member and forming seats for the respective spring means.

5. In apparatus of the class described, the combination with a rotatable element to be braked, of a braking disc movable towards and away from the same, a stationary disc member disposed at one side of said braking disc and having an axially offset annular flange spaced from the braking disc, an actuator having portions thereof interposed between the braking disc and the annular flange of the stationary disc member aforesaid, spherical fulcrum members disposed between the interposed portions of the actuator and the annular flange and permitting rocking movement of the actuator relative to the braking and stationary discs, thrust members interposed between the actuator and the braking disc at the side of the actuator opposite to the spherical fulcrum members for thrusting the braking member towards the rotatable element to be braked responsive to rocking movement of the actuator, and means for yieldably urging the braking disc away from the rotatable element to be braked and towards the stationary disc.

6. Apparatus as defined in claim 5, in combination with a second stationary braking member disposed at the side of the rotatable member to be braked opposite to the movable braking disc, with the rotatable member to be braked normally floating therebetween.

7. In apparatus of the class described, the combination with a brake housing, of a stationary energizer plate mounted therein and adjustable axially thereof, a braking disc disposed at the inner side of the energizer plate and movably mounted thereon and normally yieldably urged towards the same, while having limited angular movement relative thereto, means interposed between the energizer plate and the braking disc for moving the latter axially away from the energizer plate responsive to angular movement of the braking disc, a second braking member disposed within the housing at the side of the braking disc opposite to the energizer plate and engageable by the braking disc and adapted to be connected with a rotary part to be braked, and actuator means carried by the braking disc and energizer plate for moving the braking disc towards the second braking member.

8. In a brake of the class described, the combination with a rotary element to be braked, of a braking element bodily movable toward and away from the same and also having a limited angular movement, a stationary member disposed at one side of the braking element, means interposed between the stationary member and the braking element aforesaid and operable responsive to relative angular movement between the braking element and stationary member for moving the braking element toward braking position with the rotary element to be braked, actuator means for moving said braking element into engagement with the rotary element to be braked and comprising a member pivotally mounted with respect to the stationary member at opposite sides of the axis of the rotary member in a plane adjacent to and parallel with the axis of the rotary element to be braked, toggle pins disposed between the actuator and the braking element at opposite sides of the axis of said element in a plane passing substantially through said axis and parallel with said plane in which said actuator is pivoted, whereby upon application of initial braking thrust to said braking element through said toggle pins by said actuator and relative angular movement of said braking element incident to braking engagement with said rotary element to be braked, said pins will be inclined in the direction of rotation of said rotary element to effect an additional angular thrust component in the direction of rotation of the rotary element at equal points at opposite sides of the axis of rotation of the rotary element.

9. In apparatus of the class described, the combination with power transmission elements adapted by engagement to transmit power from one to the other, one of said elements being mounted to move bodily towards and away from the other, of an actuator rockably mounted at one side of said movably mounted transmission element with its rocking axis disposed normal to the direction of movement of said movable transmission element, said actuator having the form of a ring provided with a lever extending laterally therefrom at one side thereof, and also provided with diametrically opposite extensions constituting fulcrum bearings, and said actuator including thrust means operatively coacting with said movable transmission element and operable responsive to rocking movement of the actuator to move the movable transmission element in the direction of engagement aforesaid.

10. In apparatus of the class described, the combination with power transmission elements adapted by engagement to transmit power from one to the other, one of said elements being mounted to move bodily towards and away from the other, of an actuator rockably mounted at one side of said movably mounted transmission element with its rocking axis disposed normal to the direction of movement of said movable transmission element, said actuator having the form of a ring provided with a lever extending laterally therefrom at one side thereof, and disposed generally parallel to the central axis of the power transmission elements, and said actuator including thrust means operatively coacting with said movable transmission element and operable responsive to rocking movement of the actuator to move the movable transmission element in the direction of engagement aforesaid.

11. In apparatus of the class described, the combination with power transmission elements adapted by engagement to transmit power from one to the other, one of said elements being mounted to move bodily towards and away from the other, of an actuator rockably mounted at one side of said movably mounted transmission element with its rocking axis disposed normal to the direction of movement of said movable transmission element, said actuator having the form of a ring provided with a lever extending laterally therefrom at one side thereof, and fulcrum means disposed at opposite sides of said ring, and said actuator including thrust means operatively coacting with said movable transmission element and operable responsive to rocking movement of the actuator to move the movable transmission element in the direction of engagement aforesaid.

12. In apparatus of the class described, the combination with power transmission elements adapted by engagement to transmit power from one to the other, one of said elements being mounted to move bodily towards and away from the other, of an actuator rockably mounted at one side of said movably mounted transmission element with its rocking axis disposed normal to the direction of movement of said movable transmission element, said actuator having the form of a ring provided with a lever extending laterally therefrom at one side thereof, and fulcrum means disposed at opposite sides of said ring, and said actuator including thrust means disposed opposite to the fulcrum means and operable responsive to rocking movement of the actuator to move the movable transmission element in the direction of engagement aforesaid.

13. In apparatus of the class described, the combination with power transmission elements adapted by engagement to transmit power from one to the other, one of said elements being mounted to move bodily towards and away from the other, of an actuator rockably mounted at one side of said movably mounted transmission element with its rocking axis disposed normal to the direction of movement of said movable transmission element, said actuator having the form of a ring provided with a lever extending laterally therefrom at one side thereof, and fulcrum means disposed at opposite sides of said ring, and said actuator including thrust means operatively coacting with said movable transmission element and operable responsive to rocking movement of the actuator to move the movable transmission element in the direction of engagement aforesaid, said fulcrum means being displaced to one side of the thrust means.

14. In apparatus of the class described, the combination with power transmission elements adapted by engagement to transmit power from one to the other, one of said elements being mounted to move bodily towards and away from the other, of an actuator rockably mounted at one side of said movably mounted transmission element with its rocking axis disposed normal to the direction of movement of said movable transmission element, said actuator having the form of a ring provided with a lever extending laterally therefrom at one side thereof, and fulcrum means disposed at opposite sides of said ring, and said actuator including thrust pins disposed endwise between the actuator and movable transmission member at diametrically opposite sides of the axis thereof to move the movable transmission element in the direction of engagement aforesaid responsive to rocking movement of the actuator, said fulcrum means being displaced to one said of the thrust pins.

15. In apparatus of the class described, the combination with a brake housing, of an energizer plate fixedly mounted therein, a braking disk also disposed in the brake housing and supported by the energizer plate for axial movement towards and away from the latter, means for normally yieldably urging the braking disk towards the energizer plate, a second braking member adapted to be connected to a rotary part to be braked and disposed for operative braking engagement with the first mentioned braking disk upon movement of the latter away from the energizer plate, actuating means interposed between the energizer plate and first mentioned braking disk and wholly supported thereby under the influence of the yieldable means aforesaid for movement of the latter into braking engagement with the second braking member, and means accessible from the exterior of the brake housing for axially adjusting the energizer plate, first mentioned braking disk, and interposed actuating means, together as a unit, within the brake housing and relative to the second braking member.

16. Apparatus as claimed in claim 15, wherein the adjusting means comprises a plurality of circumferentially spaced hollow studs extending through a wall of the brake housing and disposed generally parallel to the central axis of the brake, said studs being exteriorly threaded for engagement with correspondingly threaded apertures in the brake housing to afford axial adjustment of the studs, with the inner ends of the studs loosely seated in recesses provided in the energizer plate, and a bolt extending axially through each of the studs aforesaid and each bolt having its inner end threaded into the energizer plate for drawing the latter tightly against the inner ends of the respective studs.

17. Apparatus as claimed in claim 15, wherein the adjusting means comprises a plurality of circumferentially spaced pairs of coaxial members disposed one within the other, one member of each pair being axially adjustable through the brake housing wall and having its inner extremity abutting the energizer plate, and the other member of each pair having its inner extremity positively engaged with the energizer plate to adjustably maintain the same in the abutting engagement aforesaid with the first member.

HOMER T. LAMBERT.